United States Patent [19]
Meyer, Jr.

[11] 3,939,217
[45] Feb. 17, 1976

[54] ALCOHOL PURIFICATION PROCESS

[75] Inventor: Herbert W. H. Meyer, Jr., Baytown, Tex.

[73] Assignee: Exxon Research and Engineering Company, Linden, N.J.

[22] Filed: Feb. 24, 1975

[21] Appl. No.: 552,654

[52] U.S. Cl. .... 260/643 D; 260/94.9 F; 260/643 R; 260/643 E; 423/69; 423/111
[51] Int. Cl.² ...................................... C07C 29/24
[58] Field of Search ..................... 260/643 R, 643 D

[56] References Cited
UNITED STATES PATENTS

| | | | |
|---|---|---|---|
| 2,080,064 | 5/1937 | Roelfsema | 260/643 R |
| 2,891,633 | 6/1959 | Morro et al. | 260/643 R |
| 3,208,987 | 9/1965 | Reid et al. | 260/643 F |

Primary Examiner—Joseph E. Evans
Attorney, Agent, or Firm—David A. Roth

[57] ABSTRACT

In the clean-up and recovery of isopropanol used to deash polypropylene prepared by the polymerization of propylene in the presence of a $TiCl_3 \cdot AlCl_3$ catalyst, the neutralized bottoms from the first stage of a two stage evaporization of isopropanol are deashed by adding a small quantity of water, which causes flocculation of a substantial portion of the ash in the bottoms which are separated from liquids in the system by centrifuging, with the centrate going to the second stage evaporization in which substantially only amorphous polypropylene is left as bottoms.

13 Claims, 5 Drawing Figures

ALCOHOL PURIFICATION PROCESS

BACKGROUND OF THE INVENTION

This invention relates to a process for the removal of catalyst components from a process stream used in the finishing of alpha-olefin polymers.

The polymerization of alpha-olefins, such as propylene alone or with other copolymerizable alpha-olefins, is well known and described in numerous patents, such as U.S. Pat. Nos. 2,112,300, 3,113,115, 3,197,452, Belgian Pat. No. 538,782 and British Pat. No. 994,416.

The catalyst is normally prepared from a transitional metal compound, preferably a halide, and a reducing component consisting normally of metallic aluminum or a metal alkyl compound. Representative of the transitional metal compounds used is a metal selected from Groups 4B, 5B, and 6B of the Periodic System.* Included in the preferred species are the titanium halides, for example, titanium tetrachloride, titanium trichloride, and titanium dichloride and mixtures thereof. Other metal compounds, such as zirconium tetrahalide and hafnium tetrahalide, vanadium chloride, chromium chloride, tungsten chloride, and the like, are especially useful. Still other transitional metal halides containing halogens selected from the group consisting of bromine, iodine, chlorine, and in certain instances, flourine, can also be used.

* Handbook of Chemistry and Physics, The Chemical Rubber Co., Cleveland, Ohio, 45th Edition, 1964, p.B-2

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain Ziegler catalysts, or more particularly, certain modified Ziegler catalysts, have been found to be especially useful for polymerizing alpha-olefins. For example, a titanium trichloride catalyst modified with aluminum chloride having the formula, $3TiCl_3 \cdot AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine bromine or iodine.

For purposes of this invention, the transitional metal halide and the reducing component are present in molar ratios of about 1 to 1. However, molar ratios of the transitional metal halide and the reducing component can be present in mol ratios from as low as 0.1 to 1 to as high as 6 to 1. If $TiCl_3$ is the transitional metal halide and diethyl aluminum chloride is the reducing agent, an aluminum to titanium ratio of about 0.33 atom of aluminum per atom of titanium is preferably used.

In a typical polymerization, liquid alpha-olefin is contacted with a catalyst such as $TiC_3 \cdot 1/3 AlCl_3$ plus diethyl aluminum chloride in about a 1 to 2 weight ratio. Productivity typically ranges from about 500 to 3000 pounds of polymer per pound of $TiCl_3 \cdot 1/3 AlCl_3$ catalyst.

The catalyst is simply prepared by mixing the various components whereupon an active catalyst is formed. If desired, the activated catalyst can be aged or otherwise further treated prior to use. For example, alkali metal halides, such as sodium chloride potassium iodide, lithium bromide, or sodium fluoride, can be used as additives for improving catalyst efficiency and for controlling the length of the polymer chain.

The preferred catalyst composition for the polymerization of propylene comprises a modified titanium trichloride having the structural formula, $3TiCl_3 \cdot AlCl_3$, activated with diethyl aluminum chloride. Ratios of diethyl aluminum chloride and titanium trichloride of between 0.3: 1 and 6: 1 may be advantageously used. The pressure of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

A variety of monomers may be polymerized with the Ziegler type catalysts. Any unsaturated hydrocarbon corresponding to the general formula, $R-CH=CH_2$, wherein R is selected from the group consisting of an alkyl radical having from one to six carbon atoms, a phenyl radcal, and an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like. Unsaturated hydrocarbons containing 3 to 5 carbon atoms are especially suitable. Diolefins, such as butadiene and isoprene, and alkyl substituted ehtylenic compounds having 6 to 8 carbon atoms, such as styrene, methylstyrene, and the like, may also be polymerized by these processes. Mixtures of any of the above monomers can also be used.

The monomers may be polymerized at moderate temperatures and pressures with the Ziegler type catalysts described above, generally at temperatures of 0° C to 150° C, with temperatures on the order of 25° C to 80° C being particularly useful. A solvent may be employed for the polymerizations; however, the olefin monomer is frequently used for this purpose. The polymerizations are preferably conducted under conditions that exclude atmospheric impurities such as moisture, oxygen and the like.

The pressure ranges from about atmospheric pressure to about several atmospheres with pressures in excess of about 500 p.s.i. rarely being employed.

After the polymer has been produced, the catalyst is deactivated by contacting the polymeric reaction mixture with a material which reacts with the deactivates the catalyst. Such materials include, for example, lower alcohols, acetone and water. Thereafter, the polymer may be separated from the diluent, washed with water and dried. The removal of residual amounts of catalyst is most important since even the small amounts remaining after water washing can be detrimental to the polymer. Residual ash can be detrimental, for example, during extrusion of the polymer, wherein filter screens may become plugged by the ash or if not filtered out of the polymer the ash may cause inherent weaknesses in the product, particularly filaments. Residual ash also may adversely effect antioxidant stability in the polymer and cause poor color qualities. Furthermore, proper neutralization is not normally practical without deashing. An acid polymer is undesirable, for example because of excessive equipment corrosion and poor polymer color properties. As used herein the phrase "neutralize the polymer" is understood to refer to neutralizing the acid components present in admixture with the polymer such as the chloride.

The polymerization is usually directed to the preparation of a crystalline, stereoregular structure "isotactic" polymer. In addition to the so called "isotactic" polymer, there is also produced a substantially noncrystalline, amorphous polymer, which is also desirably removed from the polymer product.

The removal of the catalyst components from the polymer usually means that these materials have been transferred to a treating or contacting material. Thus the ecological problem of the final disposal or recycle thereof has not been resolved. Frequently, substantial portions of the residual catalyst components are removed by contacting the polymer in a slurry with an alcohol having one to six carbon atoms, preferably aliphatic alcohols having one to four carbon atoms; wherein the catalyst components and amorphous polymer are soluble in the alcohol and are removed from the isotactic polymer.

The alcohol is an expensive solvent and it is recovered and reused. Because of the acidic nature of the materials extracted from the polymer, the alcohol is generally neutralized, usually with an alkali metal hydroxide, e.g., NaOH. Since there are impurities dissolved in the alcohol, the recovery is best carried out by evaporating, i.e., distilling the alcohol and leaving the residual catalyst components, other metals and amorphous polymer as bottoms which are removed and disposed of. This is normally achieved by slurring the bottoms, which are essentially free of alcohol with a hydrocarbon oil thereby dissolving the amorphous polymer, and incinerating the mixture.

The presence of the catalyst components, however, may present ecologically undesirable combustion products and are preferably removed. The hydrocarbon oil, freed of the catalyst components and containing the dissolved amorphous polymer, can be safely incinerated or employed in higher utilization, such as a specialty oil or a cracking feed for the production of motor fuel.

It is an advantage of the present invention that the residual catalyst components are separated from the amorphous polymer prior to dissolving the amorphous polymer in the hydrocarbon oil. This and other advantages and features will become apparent from the following description.

DRAWINGS

SUMMARY OF THE INVENTION

Figure 1:
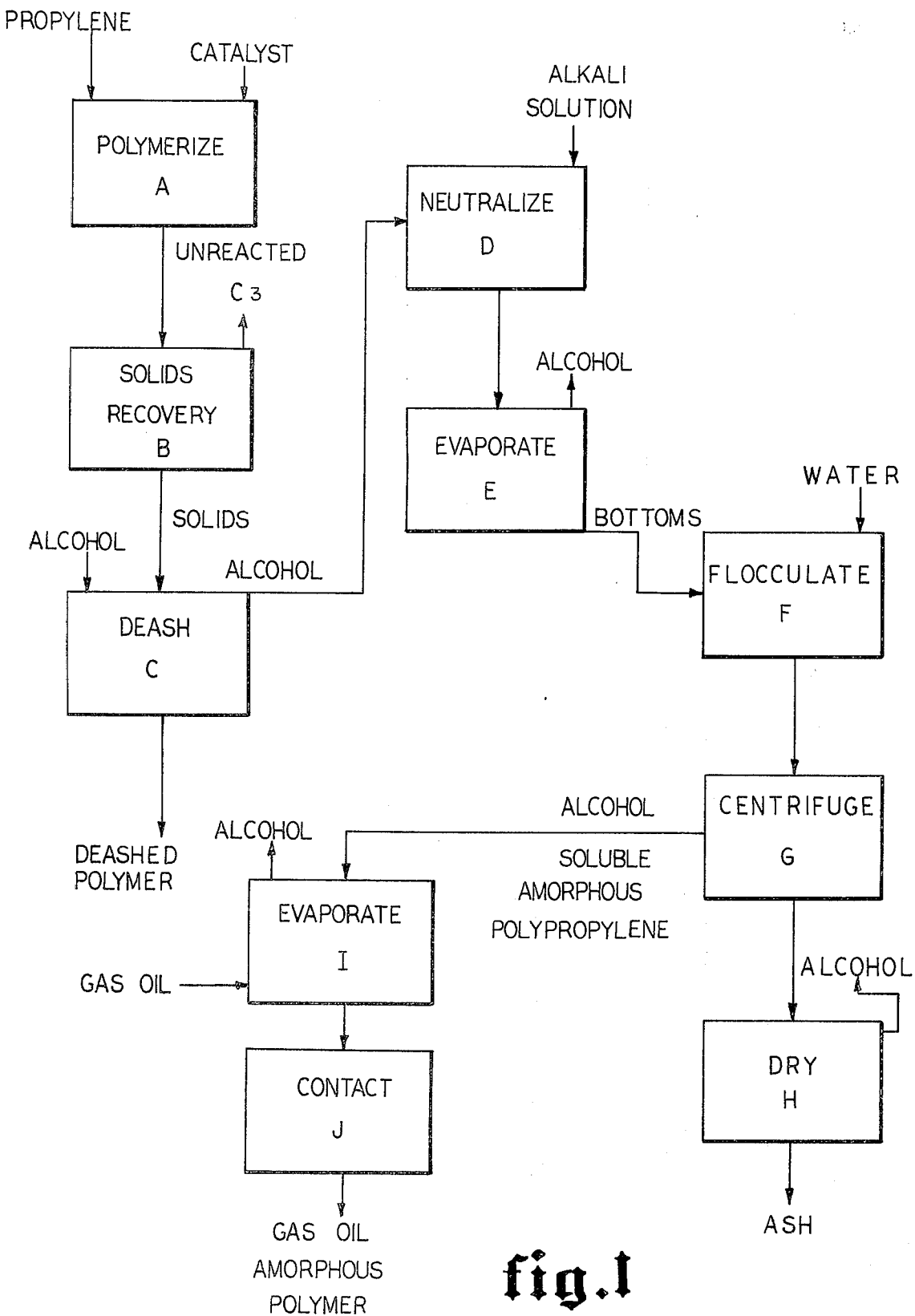
FIG. 1 is a schematic flow sheet of the process steps of the present invention in relation to a polymerization process.

Briefly stated the present invention is a process for removing contaminates comprising metals and particularly neutralized Ziegler type catalyst components from admixture with $C_1$ to $C_6$ alcohol and amorphous alpha-olefin polymer, comprising adding a minor amount of water to said mixture, forming floc containing a substantial portion of said contaminates, centrifuging said mixture to remove the floc therefrom and recovering a liquid portion having substantially reduced contaminates therein. The alcohol contains a substantial portion of the amorphous polymer, although polymer fines are preferably removed along with the metal contaminates by the centrifuging. The flocculation may be carried out at a temperature in the range of 90° to 250°F.

DETAILED DESCRIPTION OF THE INVENTION AND PREFERRED EMBODIMENTS

The metal contaminates removed frequently comprise Ti, Al, Na, and Cl. The sodium contaminates arise from the use of NaOH to neutralize the polymerization product. The other contaminates are Ziegler type catalyst components. The metal components are principally dissolved or suspended in the alcohol. Also a substantial portion of the amorphous polymer is dissolved in the alcohol, which may contain a minor amount, such as, up to 40 volume percent of lower hydrocarbons of 5 to 8 carbon atoms, e.g., n-heptane. The lower hydrocarbons may aid in solublizing the amorphous polymer. The alcohol feed in the present process may be lower alkanols, for example, methanol, ethanol, isopropanol, isohexanol or the like. Preferably the feed has been subjected to further neutralization and to a distillation wherein a substantial portion of the alcohol and any hydrocarbon have been removed, leaving a relatively concentrated solution of metal contaminates, preferable about 5 to 30 weight percent contaminates based on the alcohol.

Only a small amount of water, i.e., about 0.1 to 5 volume percent based on the alcohol is needed to achieve the high degree of contaminate removal observed. It has been found that preferably only about 0.1 to 1.0 volume percent water is required in a continuous operation. Since some standing time is desirable after the addition of the water in order to maximize the floc formation, it may be that the continuous process allows relatively less standing time for maximum floc formation. This view is supported by the observation that increased ash removal occurs with reduced feed rates in the continuous process. Likewise increasing the water addition rate increased ash removal. Thus in carrying out the present process, the relation between retention time of the water in admixture with alcohol prior to centrifuging and amount of water should be determined for maximizing ash removal for given types of processes. The present examples and the figures teach the operator of the process the perimeters and the manner of maximizing ash removal for particular alcohol compositions.

It has been determined that the presence of small amounts of polyvalent metal electrolytes, i.e., about 1 to 15 weight percent based on water in the system, added with the water enhances the floc formation. Suitable electrolytes include $AlCl_3$, iron (III) chloride and the like. It has also been observed that the pH of the flocculation system should be adjusted in the range of about 4 to 12, preferably about 6 to 11. The pH of the flocculation system may be adjusted by the neutralization of the alcohol prior to distillation and by the addition an excess of alkali solution of from 10 to 500 ppm weight calculated as NaOH beyond that needed for neutralization.

Generally amorphous polymer, e.g., atactic polypropylene will be present in the alcohol in from about 10 to 50 weight percent based on the alcohol (depending on the manner of the polymerization and on the selectivity of the solvents used to remove the soluble polymer from the polymer reaction product).

In a preferred embodiment the present invention is used to remove catalyst components (i.e., ash) from a process stream related to the finishing of polypropylene polymer prepared by the polymerization of propylene in the presence of $TiCl_3.1/3 AlCl_3$ catalyst as known in the art. More specifically the present invention is employed to substantially remove all of the catalyst components from admixture with alcohol and dissolved amorphous polyropylene, before the residual bottoms from the alcohol distillation are contacted with a scavenger oil.

The relationship of the present invention to the propylene polymerization and the scavenger oil can be seen more clearly by reference to FIG. 1, wherein a simplified schematic of the process steps is presented.

In the first step the alpha-olefin, propylene is polymerized A with $TiCl_3.1/3 AlCl_3$ diethyl aluminum chloride catalyst, followed by solid polymer recovery B and removal of unreacted propylene and deashing C of the polypropylene porduct, with a $C_1$ to $C_6$ alcohol, in this case isopropyl alcohol, which dissolves (or suspends) the catalyst components (ash) and amorphous polypropylene leaving a deashed highly stereoregular polymer.

The deashing alcohol may also contain a minor amount of a lower hydrocarbon as described above. The deashed alcohol is neutralized D with an excess of alkali, e.g., 100 ppm NaOH necessary to neutralize the alcohol containing the ash. Very good separations have been achieved near neutrality or the isoelectric point, i.e., pH 6.5–7.5.

The alcohol is recovered by evaporization, i.e., distillation in two stages. In the first stage about 30 to 70 volume percent of the alcohol is evaporated E leaving the bottoms, containing the balance of the alcohol, the dissolved catalyst components, alkali neutralizers and amorphous polymer. The bottoms are flocculated E by the addition of a small quantity of water. The floc may contain 90 percent or more of the ash. To separate the floc from the liquid portion of the system all of the materials are centrifuged G and the centrate liquids are subjected to a second evaporation I which removes residual alcohol and any cosolvents producing a residue (evaporization I bottoms) which is substantially free of ash and which is comprised principally of amorphous polypropylene. A hydrocarbon oil, e.g., a gas oil is added to the second stage evaporization, Contact J, to reduce the viscosity in evaporation I.

The hydrocarbon oil has a initial boiling point not substantially lower than 400°F and a final boiling point not substantially above 900°F. This fraction can be derived from any source of crude petroleum and its specific composition can vary considerably, and may include such fractions as cracked gas oil boiling in the range of 400°–650°F. The hydrocarbon oil may be a hydrocarbon mixture boiling over the entire range of about 400° to 900°F or a fraction boiling at or over any portion that range.

The gas oil containing the amorphous polypropylene therein may be effectively used as catalystic cracking feed or as a specialty oil.

The solid residue from the centrifuging G contains 36 percent solids which are dried at 170° to 275°F and produce a powdery, friable easily flowable powder, from which the metals may be recovered, or which is safely disposed of by other means. The alcohol from the drying is recovered. The recovered alcohol as noted above may contain lower hydrocarbons. The recovered alcohol from the ash drying H may be dried (not shown) and recycled to the deashing step C as may the alcohol from the evaporations E and I.

EXAMPLE 1

Figure 2:
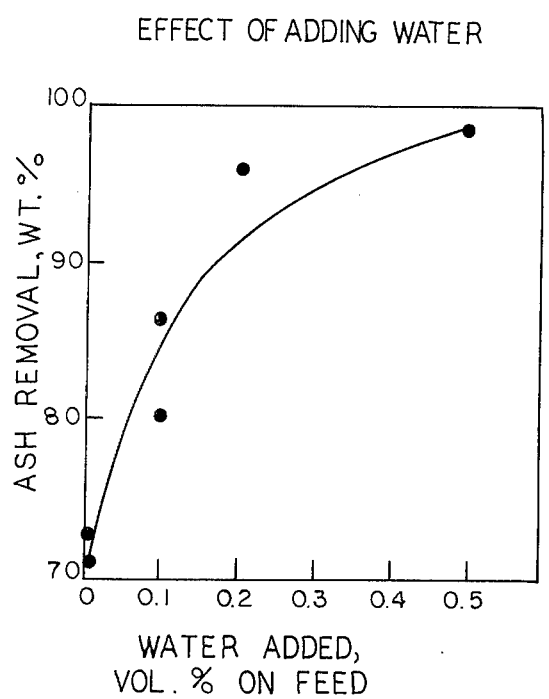
FIG. 2 is a graph showing the effect of water on flocculation.

This example demonstrates operation of the present invention in a batch operation. The effect of the addition of various levels of water to the bottoms from the first stage evaporization are set out in FIG. 2. Flocculation times, i.e., standing time prior to centrifuging were about 5 minutes for each run in FIG. 2, and the centrifuging was about 5 minutes for each run. Prior to centrifuging the samples were heated to 160°F.

EXAMPLE 2

Figure 3:
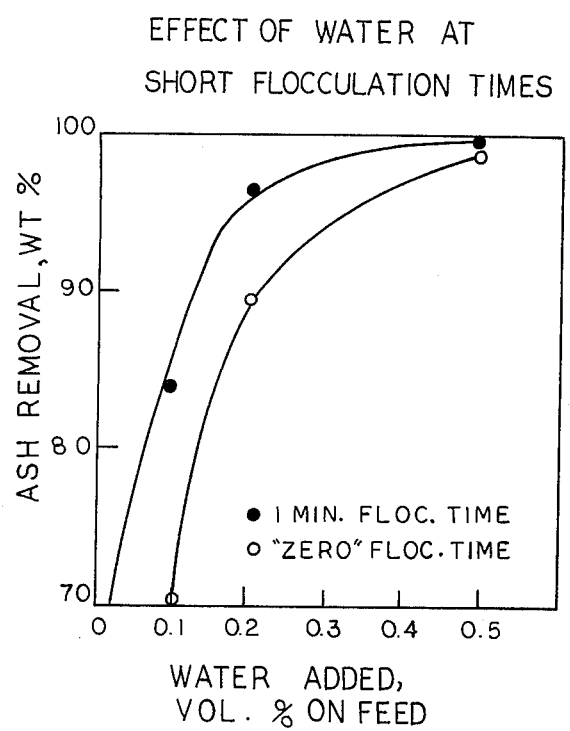
FIG. 3 is a graph showing the effect of standing time on flocculation.

This example, also batch demonstrates the effect of short flocculation times on ash removal. Each sample was heated to 160°F prior to centrifuging which was carried out for 5 minutes. The results are shown in the graph of FIG. 3.

EXAMPLE 3

Figure 4:
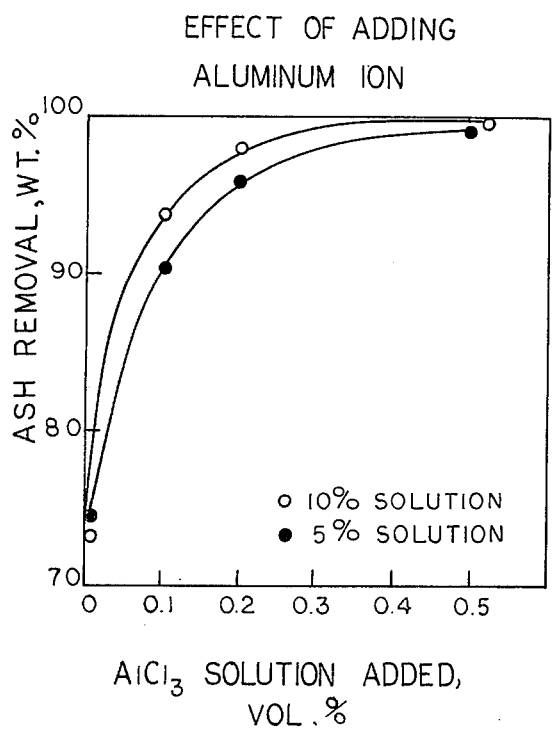
FIG. 4 is a graph showing the effect of added electrolyte on flocculation.

This example, carried out in batch, demonstrates the improvement which can be obtained with an added polyvalent cation. A five and 10 percent solution of $AlCl_3$ were used. The pH was 6.9 to 7.0, flocculation time 1 minute and samples were heated to 160°F prior to centrifuging for 5 minutes. The results are shown in FIG. 4.

EXAMPLE 4

Figure 5:
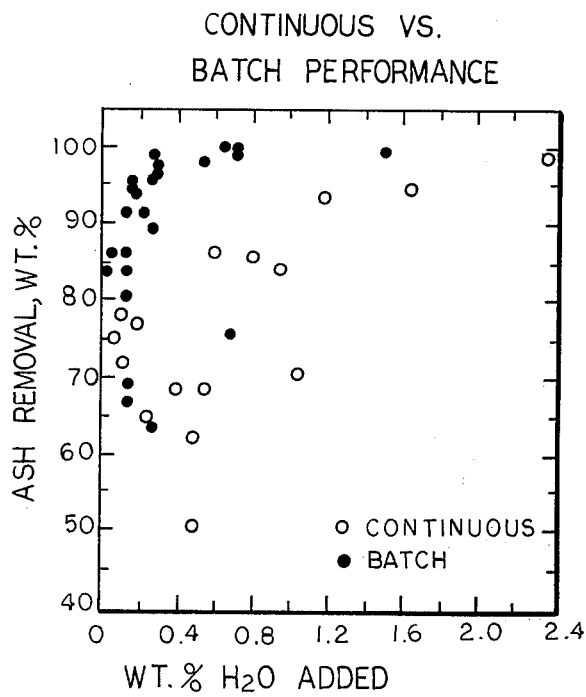
FIG. 5 is a graph comparing batch and continuous operation of the present invention.

This example demonstrates a continuous run of a bottoms stream from the first stage evaporization, which is similar to that used in examples 1–4, however, it should be appreciated that actual plant streams were used for all examples and that some variation of the type routine experienced in the utilization of the present invention does occcur. The centrifuges for both the batch and continuous process were operating at about the same settling severity. The continuous centrifuge was a Sharples P-850. The feed rate was about 1000 pounds/hour of bottoms for the determinations with the pH being basic. The temperature of the flocculating and centrifuging was about 170°F. The results of the continuous operation under these conditions are compared to batch data in FIG. 5. The difference in the amounts of water required in batch and continuous process is thought to be due to the quiescent settling in the batch centrifuge.

The Invention claimed is:

1. A process for the recovery of lower alkanol used to deash alpha-olefin polymer wherein the alkanol after deashing comprises a mixture of said alkanol, contaminates and amorphous alpha-olefin polymer which comprises adding a minor amount of water to said mixture to form a floc containing a substantial portion of said contaminates, centrifuging said mixture to remove the floc therefrom, and thereafter evaporating to recover alkanol.

2. The process according to claim 1 wherein the temperature is in the range of 90° to 250°F.

3. The process according to claim 2 wherein about 0.1 to 5 volume percent water based on the volume of alkanol present is added.

4. The process according to claim 3 wherein said process is batch and the volume percent of water added is about 0.1 to 1.0.

5. The process according to claim 3 wherein said process is continuous and the volume percent of water added is about 0.3 to 2.0.

6. The process according to claim 1 wherein said contaminates are present in about 5 to 30 weight percent based on the alkanol 7. The process according to claim 6 wherein contaminates comprise Ti, Al, Na, and Cl.

8. The process according to claim 1 wherein the pH of the flocculation system is in the range of 4 to 12.

9. The process according to claim 8 wherein the pH is in the range of 6 to 10.

10. The proess according to claim 1 wherein from 1 to 15 weight percent based on water of a trivalent metal electrolyte is present.

11. The process according to claim 1 wherein up to 40 volume percent of a $C_5$ to $C_8$ hydrocarbon is present as a cosolvent in the lower alkanol used to deash said polymer.

12. The process according to claim 9 wherein the pH is in the range of 6.5 to 7.5.

13. The process according to claim 1 wherein said alkanol is a $C_1$ to $C_6$ alkanol.

* * * * *